(12) United States Patent
Herman et al.

(10) Patent No.: US 11,971,087 B2
(45) Date of Patent: Apr. 30, 2024

(54) MULTI-ACTUATOR ROTATOR ASSEMBLY

(71) Applicant: Quickthree Technology, LLC, Yardley, PA (US)

(72) Inventors: Alvin Herman, Saskatoon (CA); Erin Herman, Clavet (CA)

(73) Assignee: Quickthree Technology, LLC, Yardley, PA (US)

( * ) Notice: Subject to any disclaimer, the term of this patent is extended or adjusted under 35 U.S.C. 154(b) by 267 days.

(21) Appl. No.: 17/605,902

(22) PCT Filed: Apr. 20, 2020

(86) PCT No.: PCT/US2020/028922
§ 371 (c)(1),
(2) Date: Oct. 22, 2021

(87) PCT Pub. No.: WO2020/223051
PCT Pub. Date: Nov. 5, 2020

(65) Prior Publication Data
US 2022/0307576 A1   Sep. 29, 2022

Related U.S. Application Data

(60) Provisional application No. 62/840,455, filed on Apr. 30, 2019.

(51) Int. Cl.
*F16H 21/44* (2006.01)
*B65G 41/00* (2006.01)

(52) U.S. Cl.
CPC ........... *F16H 21/44* (2013.01); *B65G 41/007* (2013.01); *B65G 2201/042* (2013.01)

(58) Field of Classification Search
USPC ...................................... 414/695.5
See application file for complete search history.

(56) References Cited

U.S. PATENT DOCUMENTS

| 4,544,176 A | 10/1985 | Helmick |
| 6,708,814 B2 * | 3/2004 | Wagstaffe .............. B65G 21/14 198/581 |
| 7,967,547 B2 | 6/2011 | Osanai |
| 2015/0129365 A1 | 5/2015 | Olkkonen et al. |

FOREIGN PATENT DOCUMENTS

WO    2013112180    8/2013

OTHER PUBLICATIONS

International Search Report and Written Opinion for PCT/US20/28922, dated Jul. 15, 2020.

* cited by examiner

*Primary Examiner* — William R Harp
(74) *Attorney, Agent, or Firm* — Sheehan Phinney Bass & Green PA

(57) ABSTRACT

A multi-actuator rotator assembly includes a base, a rotary link coupled to the base and able to pivot relative to the base, a rotating body coupled to the base and able to pivot relative to the base, a first linear actuator connected to the base and to a first side of the rotary link, and a second linear actuator connected to a second side of the rotary link and to the rotating body.

25 Claims, 12 Drawing Sheets

SECTION B-B

MULTI-ACTUATOR ROTATOR ASSEMBLY

CROSS-REFERENCE TO RELATED APPLICATIONS

The present application is a national phase entry of International Application No. PCT/US20/28922, entitled MULTI-ACTUATOR ROTATOR ASSEMBLY, which was filed on Apr. 20, 2020, which claims the benefit of priority to U.S. Provisional Patent Application No. 62/840,455, entitled MULTI-ACTUATOR ROTATOR ASSEMBLY, which was filed on Apr. 30, 2019. The disclosures in the prior applications are incorporated by reference herein in their entirety.

FIELD OF THE INVENTION

This application relates to a rotator assembly and, more particularly, to a multi-actuator rotator assembly.

BACKGROUND

Traditionally, linear actuators had limited utility when used to generate a rotary motion. In a simple arrangement, for example, a linear actuator such as a hydraulic ram or linear electric actuator may be limited to producing a maximum rotation angle of less than 180 degrees. As the rotation approaches this limit, the system will tend to overcenter and either become locked, or else become unstable as at the 180 degree point, the mechanism may be unable to control the direction of rotation. Also, in a single actuator system, rotation is generally limited to much less than 180 degrees because the system geometry dictates that the rotational force produced (torque) decreases to zero as the system approaches the 180 degree limit. This is because the center of rotation becomes aligned with both ends of the linear actuator. In a typical configuration the linear actuator is connected directly between a stationary section (base) and the body being rotated and the two bodies may be connected with a pivotable connection such as a shaft or bearing.

SUMMARY OF THE INVENTION

In one aspect, an apparatus (e.g., a multi-actuator rotator assembly) includes a base, a rotary link coupled to the base and able to pivot relative to the base, a rotating body coupled to the base and able to pivot relative to the base, a first linear actuator connected to the base and to a first side of the rotary link, and a second linear actuator connected to a second side of the rotary link and to the rotating body (e.g., at a forward end of the rotating body).

In another aspect, a system includes the multi-actuator support assembly, a support structure for the multi-actuator rotator assembly, and a supported assembly (e.g., a conveyor or the like) coupled to the multi-actuator rotator assembly.

In still another aspect, a method includes providing, at a worksite, a system that includes the multi-actuator support assembly, a support structure for the multi-actuator rotator assembly, and a supported assembly (e.g., a conveyor or the like) coupled to the multi-actuator rotator assembly, and using the multi-actuator rotator assembly, at the worksite, to pivot the supported structure relative to support structure from a first position to a second position.

In some implementations, one or more of the following advantages are present.

For example, in a typical implementation, the multi-actuator rotator assembly disclosed herein is able to produce high torque rotational motion across a very wide arc (e.g., 200 degrees or more) using a pair of linear actuators and a relatively simple mechanical configuration.

Moreover, in a typical implementation, the multi-actuator rotator assembly is able to impart this rotational motion to move or pivot heavy loads, such as a cantilevered conveyor hung off a rotating portion of the multi-actuator rotator assembly, for example. Not only can the multi-actuator rotator assembly cause a heavy load like that to move, but it can also resist motion by the heavy load when motion is undesired).

The motion produced by the multi-actuator rotator assembly 100 typically is smooth, slow, and easy to control with great precision.

The relative simplicity of the multi-actuator rotator assembly makes it a low cost, easy-to-assemble and disassemble, easy-to-repair, easy-to-operate, and elegant configuration.

Other features and advantages will be apparent from the description and drawings, and from the claims.

BRIEF DESCRIPTION OF THE DRAWINGS

Like reference characters refer to like elements.

DETAILED DESCRIPTION

Figure 1A:
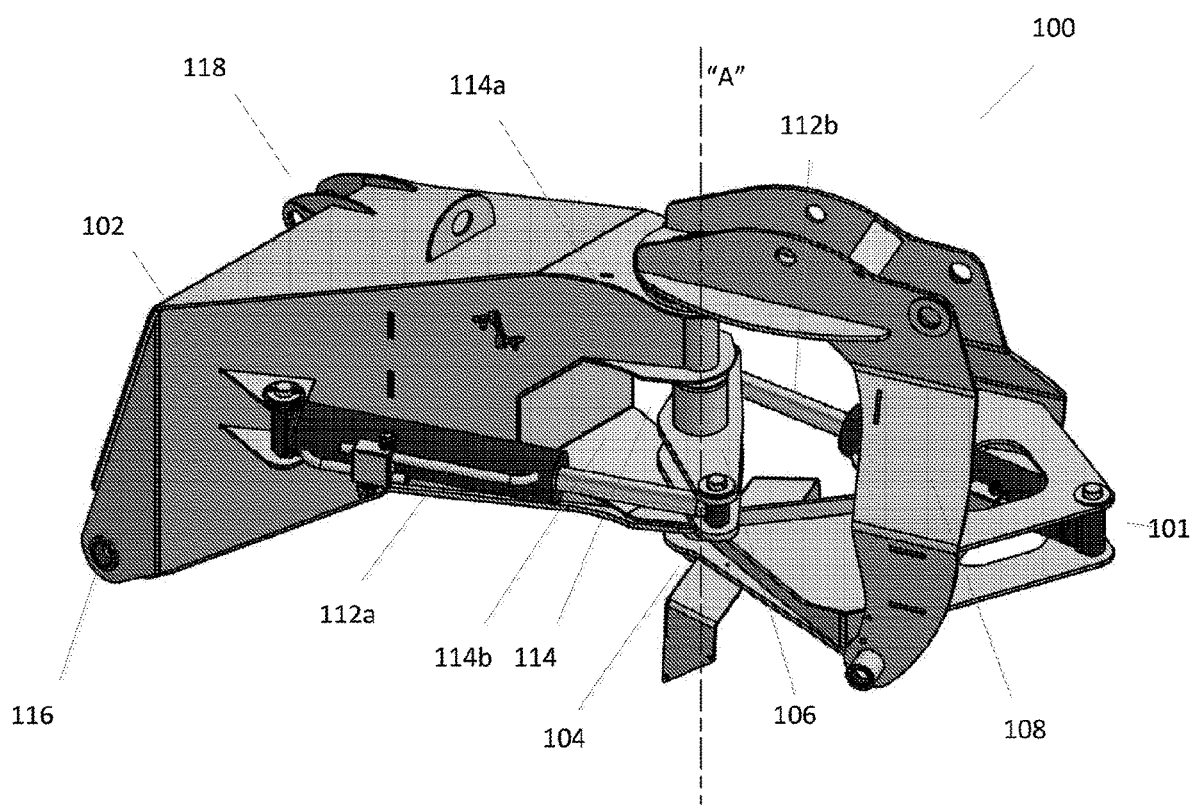
FIG. 1A is a perspective view of a multi-actuator rotator assembly in a first configuration.
Figure 1B:
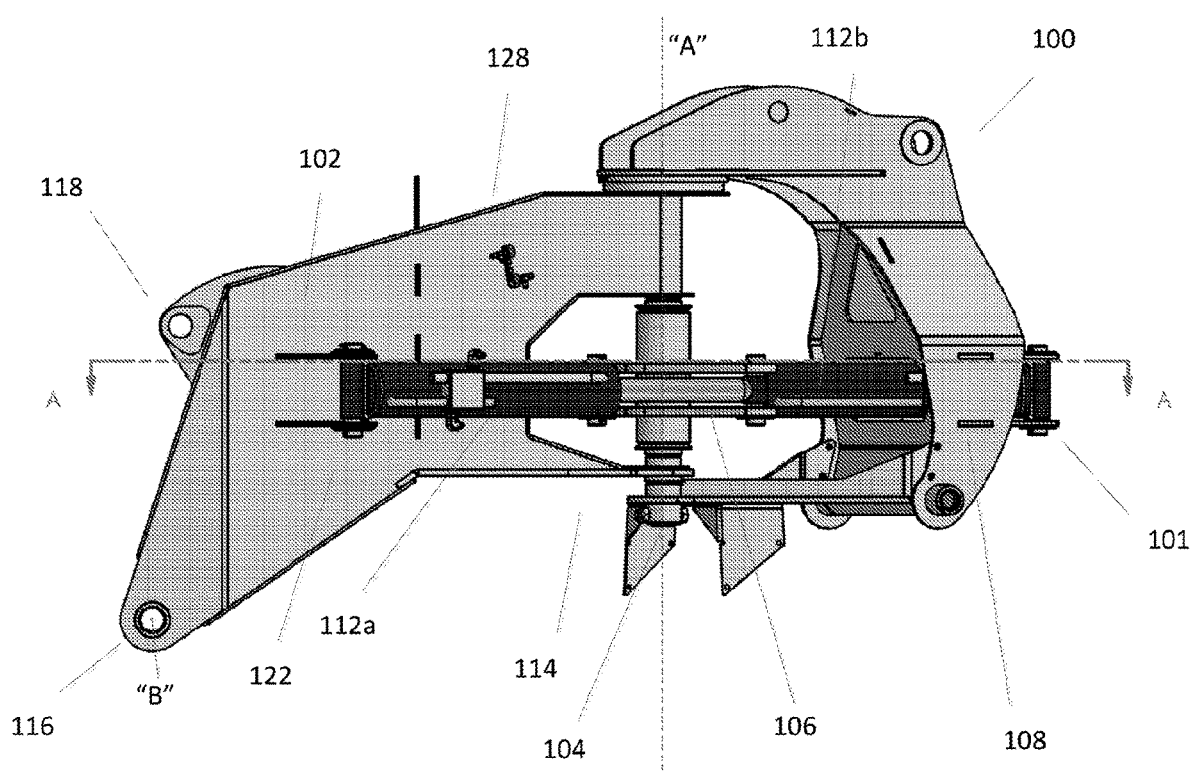
FIG. 1B is a side view of the multi-actuator rotator assembly in the first configuration.

This application relates to an assembly that is able to produce high torque rotational motion across a wide arc using a pair of linear actuators and a relatively simple mechanical configuration to produce the motion. This assembly, referred to herein as a multi-actuator rotator assembly 100, is shown on its own in FIGS. 1-4 and as part of a system in FIGS. 5 and 6.

The multi-actuator rotator assembly 100 has a base 102, a pivot shaft 104, a rotary link 106, a rotating body 108, and two linear actuators 112*a*, 112*b*. The base 102 defines a main bracket 114 that includes an upper bracket portion 114*a* and a lower bracket portion 114*b*. The main bracket 114 supports the pivot shaft 104 between the upper bracket portion 114*a* and the lower bracket portion 114b along a main vertical axis (A). The rotary link 106 and the rotating body 108 are coupled to the pivot shaft 104 and able to rotate or pivot, independently, relative to the pivot shaft 104 about the main vertical axis (A).

One end of the first linear actuator 112a is connected to the base 102 and the opposite end of the first linear actuator 112a is connected to a first side of the rotary link 106. One end of the second linear actuator 112b is connected to a second side of the rotary link 106 and the opposite end of the second linear actuator 112b is connected to the rotating body 108 near a distal end 101 of the rotating body 108. Each linear actuator 112a, 112b has an inner piston and an outer cylinder that can move relative to each other in a linear fashion between a fully retracted position and a fully extended position.

During operation, the linear actuators 112a, 112b extend and retract opposite each other. So, while the first linear actuator 112a is extending, the second linear actuator 112b is retracting, and while the second linear actuator 112b is extending, the first linear actuator 112a is retracting. When the first linear actuator 112a reaches a fully retracted position and the second linear actuator 112b reaches a fully extended position (see, e.g., FIG. 2C), the distal end 101 of the multi-actuator rotator assembly 100 is in an extreme right position. When the first linear actuator 112a reaches a fully extended position and the second linear actuator 112b reaches a fully retracted position (see, e.g., FIG. 3C), the distal end 101 of the multi-actuator rotator assembly 100 is in an extreme left position. The angular distance between the extreme right and extreme left positions can be great—at least 200 degrees and typically about 210 degrees.

Figure 1C:
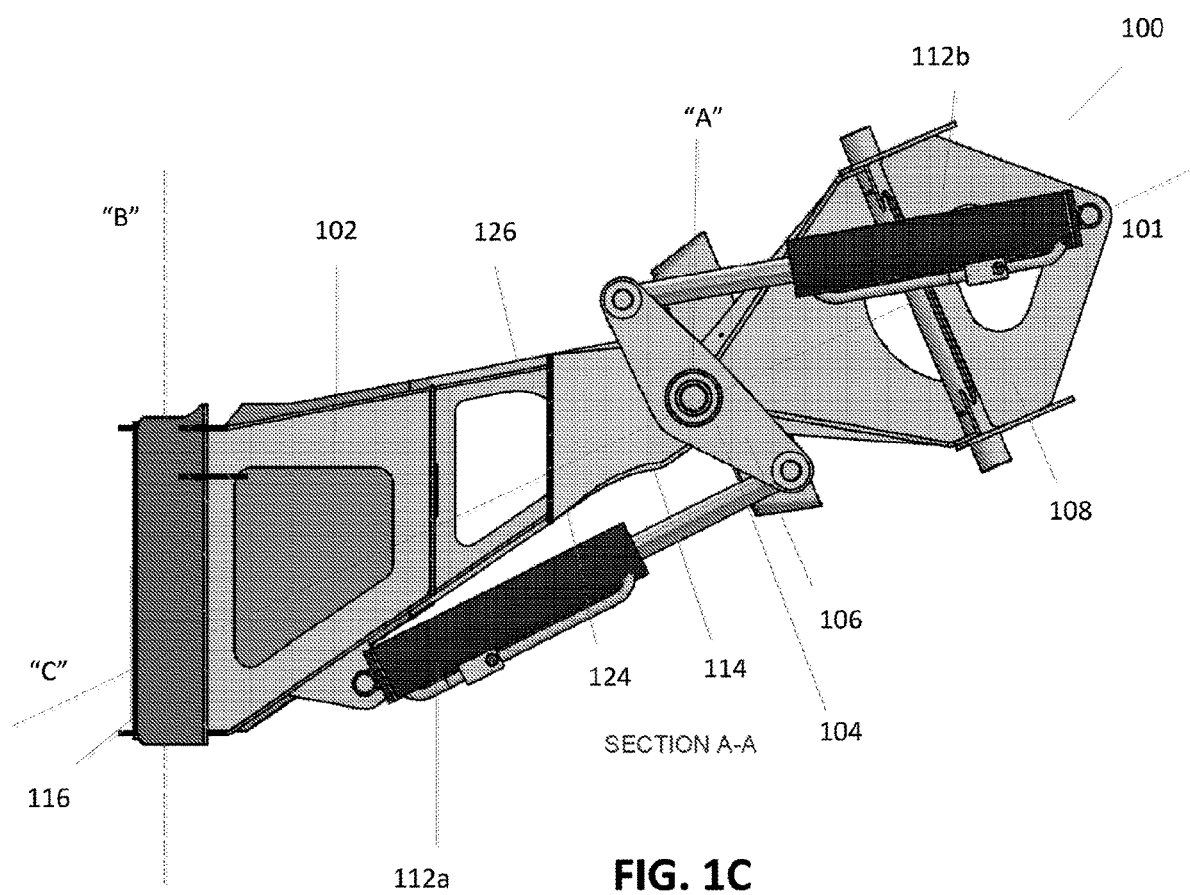
FIG. 1C is a cross-sectional top view (taken along line A-A in FIG. 1B) of the multi-actuator rotator assembly in the first configuration.
Figure 2A:
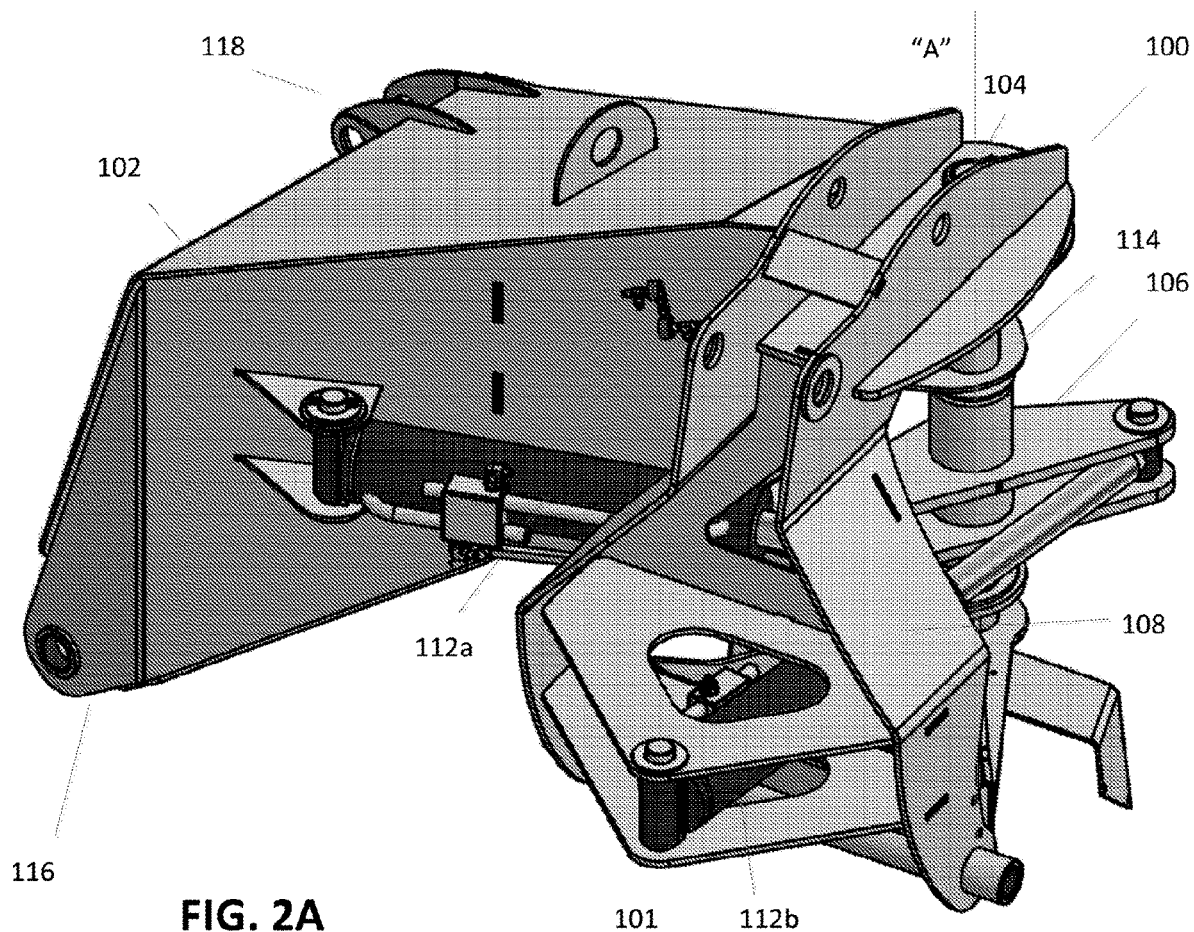
FIG. 2A is a perspective view of the multi-actuator rotator assembly in a second configuration.
Figure 2B:
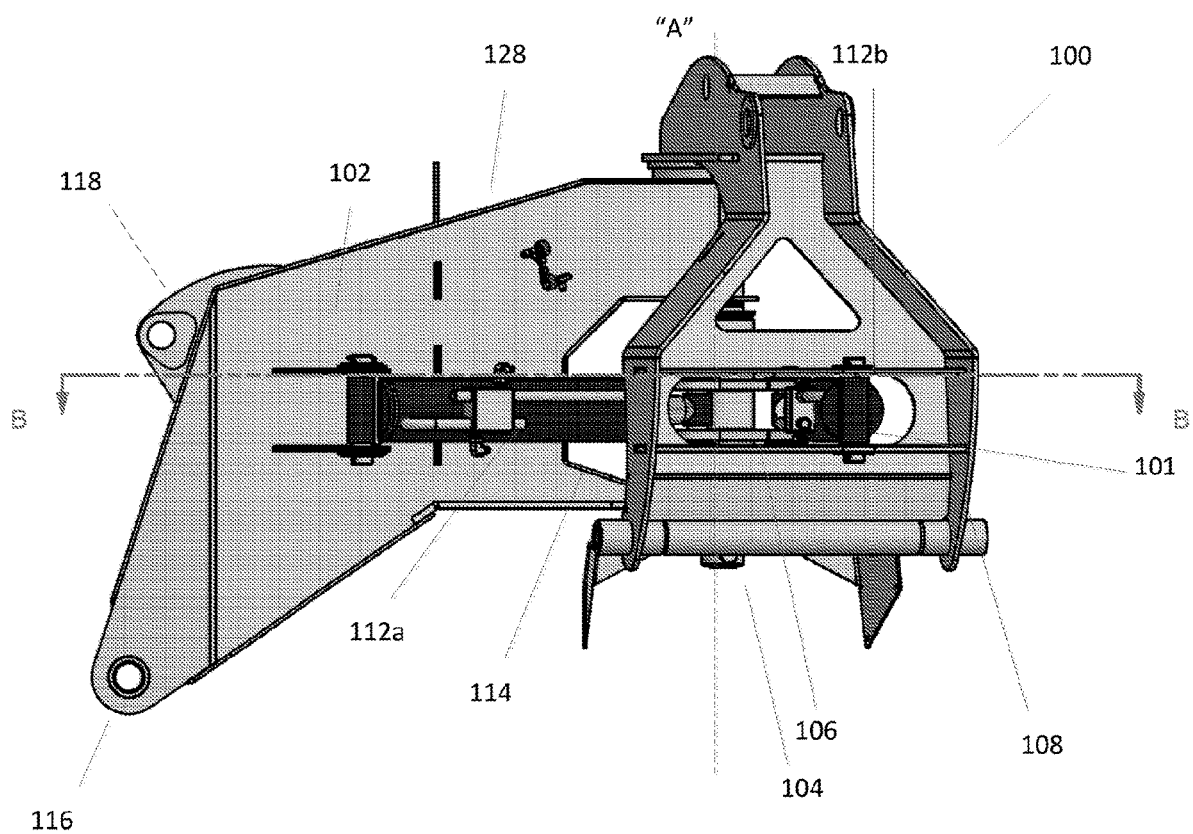
FIG. 2B is a side view of the multi-actuator rotator assembly in the second configuration.
Figure 2C:
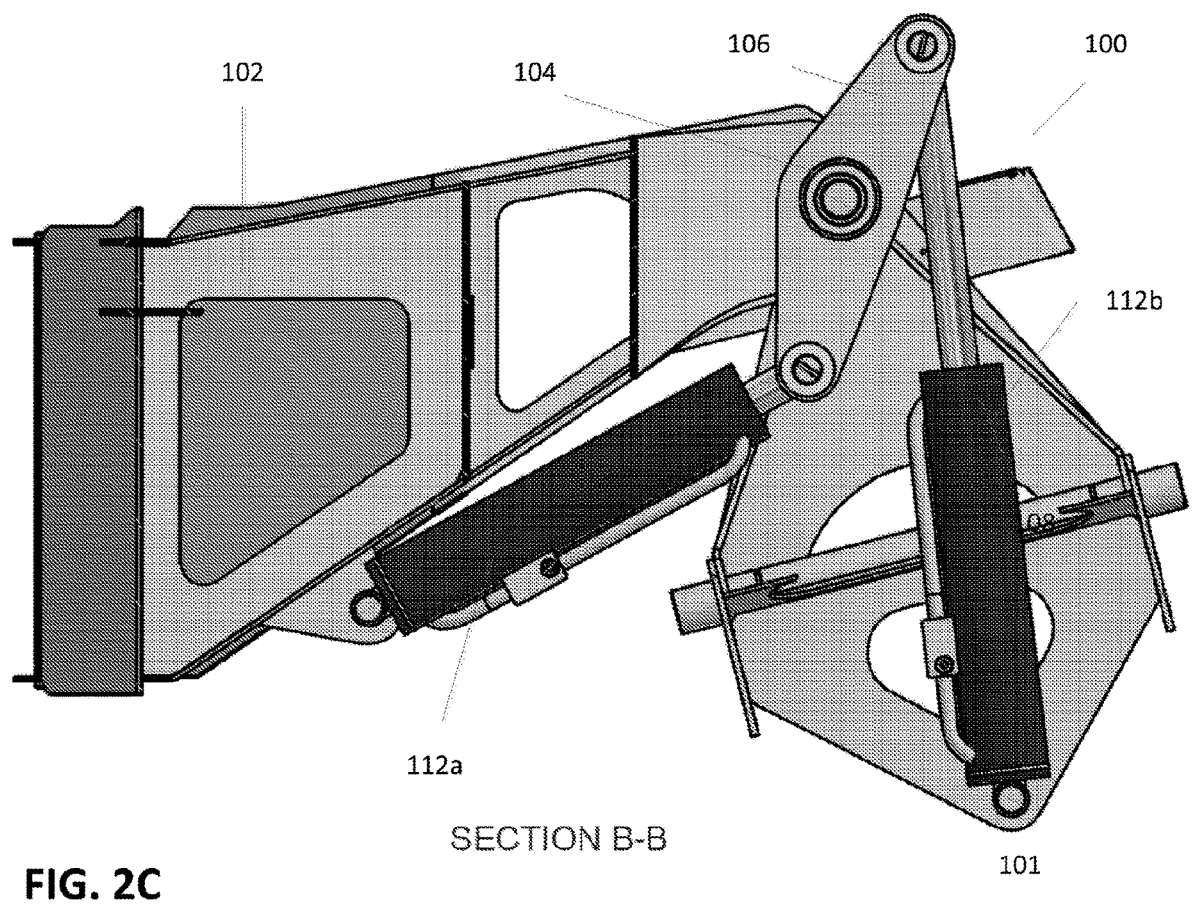
FIG. 2C is a cross-sectional top view (taken along line B-B in FIG. 2B) of the multi-actuator rotator assembly in the second configuration.
Figure 3A:
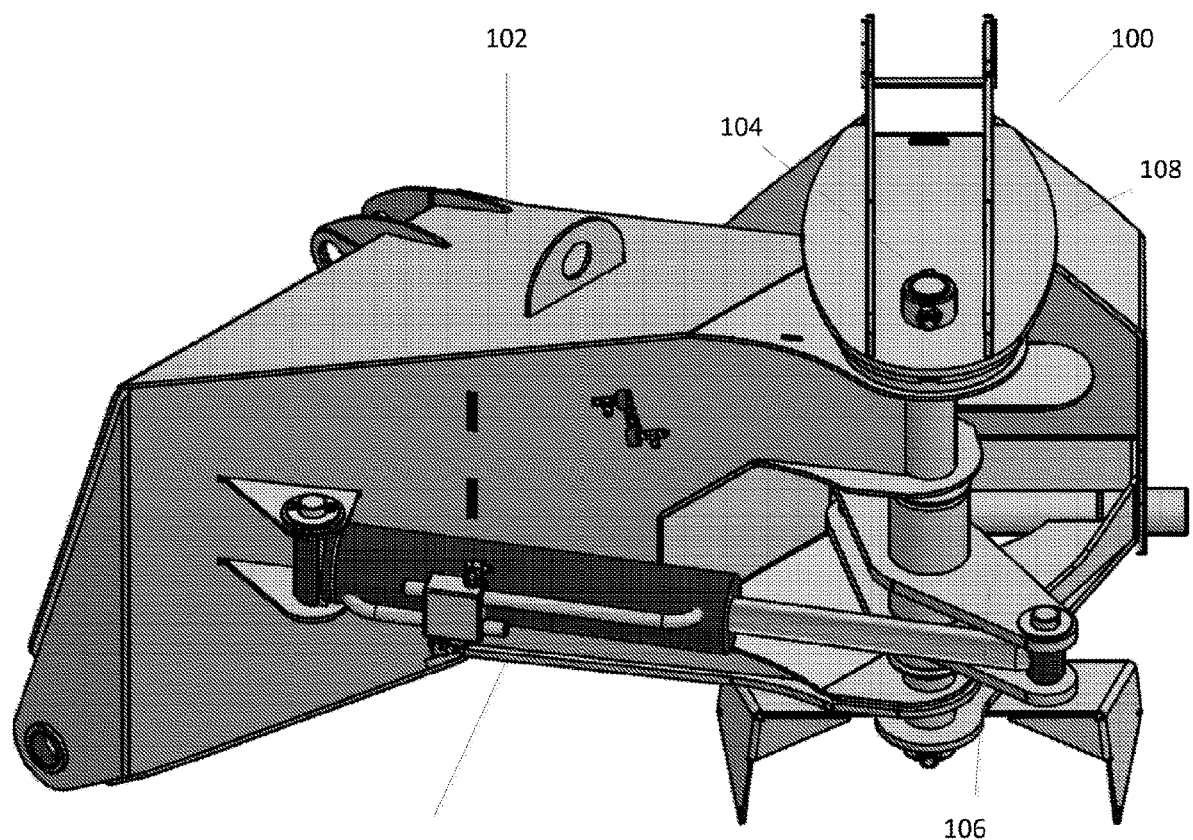
FIG. 3A is a perspective view of the multi-actuator rotator assembly in a third configuration.
Figure 3B:
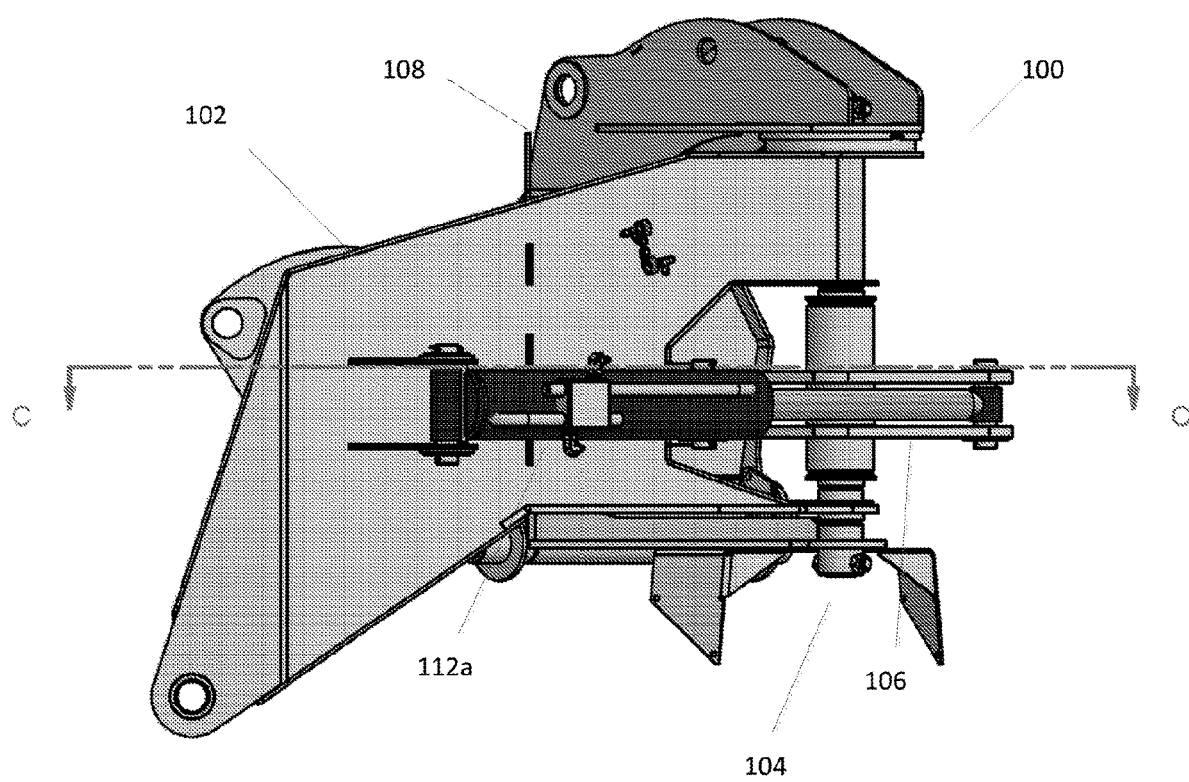
FIG. 3B is a side view of the multi-actuator rotator assembly in the third configuration.
Figure 3C:
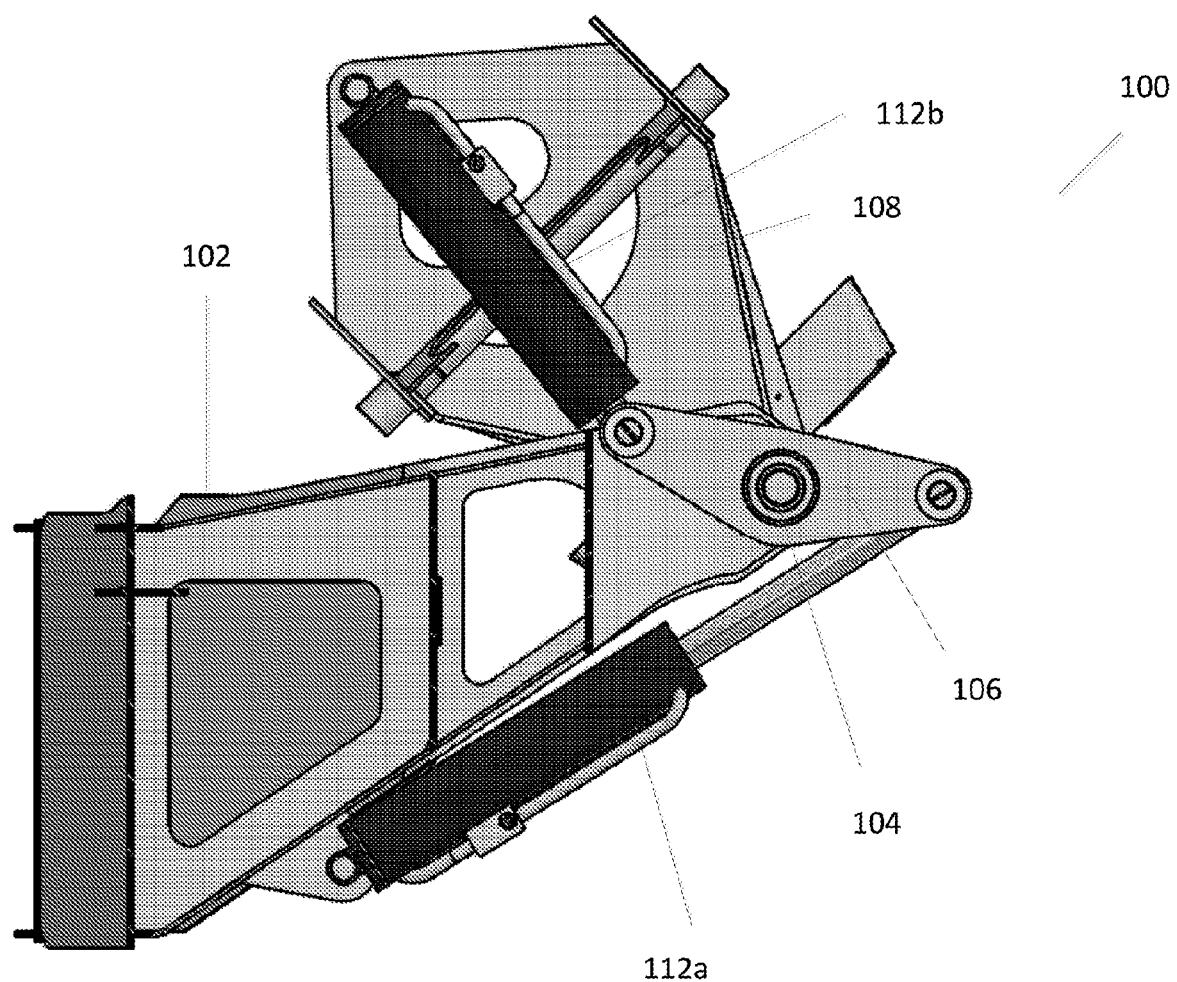
FIG. 3C is a cross-sectional top view (taken along line C-C in FIG. 3B) of the multi-actuator rotator assembly in the third configuration.

When both linear actuators are about midway between fully extended and fully retracted (see, e.g., FIG. 1C), the distal end 101 of the multi-actuator rotator assembly 100 is in a middle or neutral position where it creates the appearance of extending approximately straight out from the base 102 along a straight a longitudinal axis (C) (see, e.g., FIG. 1C). The middle or neutral position of the distal end 101 of the multi-actuator rotator assembly 100 in FIG. 1C is approximately 100 degrees from the extreme right position of FIG. 2C and approximately 110 degrees from the extreme left position of FIG. 3C. The rotating body 108 of the multi-actuator rotator assembly 100 is movable, with great precision, about the main axis (A) to any position between the extreme right position of FIG. 2C and the extreme left position of FIG. 3C. Moreover, in FIG. 1C, the actuators are almost parallel with each other, which helps minimize any twisting/side loading on the pivot shaft 104.

In a typical implementation, the multi-actuator rotator assembly 100 is able to impart a great deal of torque to the rotating body 108 causing it to move or pivot about the main vertical axis (A), or tending to hold the rotating body 108 in place, and resist undesired rotation, at a selected position (e.g., the extreme right position, the extreme left position, or anywhere in between) relative to the main vertical axis (A). This high torque helps make the multi-actuator rotator assembly 100 well suited to be able to move or pivot heavy loads, such as a cantilevered conveyor hung off the rotating body 108, for example. In a typical implementation, the motion that the rotating body 108 experiences, as it moves about the main vertical axis (A) is smooth and slow. Thus, in a typical implementation, the multi-actuator rotator assembly 100 provides high torque, smooth motion, across a very wide arc (e.g., 210 degrees) using a relatively simple, low cost, easy-to-assemble and disassemble, easy-to-repair, easy-to-operate, and elegant configuration.

The torque that is generated at the rotating body is scalable by changing the length and force rating of the actuators, for example. That is, the torque is somewhat independent of the base and rotating body as different linear actuators could be substituted to achieve different torque. Longer actuators result in a greater offset between the pivot axis "A" and the centerline of the actuator. The force acting at that offset distance is generally what generates the torque. In various implementations, the torque can range between about 21,000 ft-lbs and 64,000 ft-lbs. Typically, hydraulic cylinders (and other linear actuators, such as electric or pneumatic actuators) are sized by "stroke" which is the difference between the retracted length and the extended length. In one exemplary two-actuator rotator system, the resultant (maximum) output torques would be as follows:

| Stroke (inches) | ultimate output torque (ft-lbs) |
|---|---|
| 24 | 63,407 |
| 16 | 42,372 |
| 12 | 31,829 |
| 8 | 21,262 |

Note, these calculations assume hydraulic cylinders with 4" bores, operating at maximum 3000 psi with 1.25" rod diameter, to produce a total rotation angle of 240 degrees. With the appropriate supply of hydraulic oil this rotation could be done within a couple of seconds, or metered to take up to several minutes.

Figure 4:
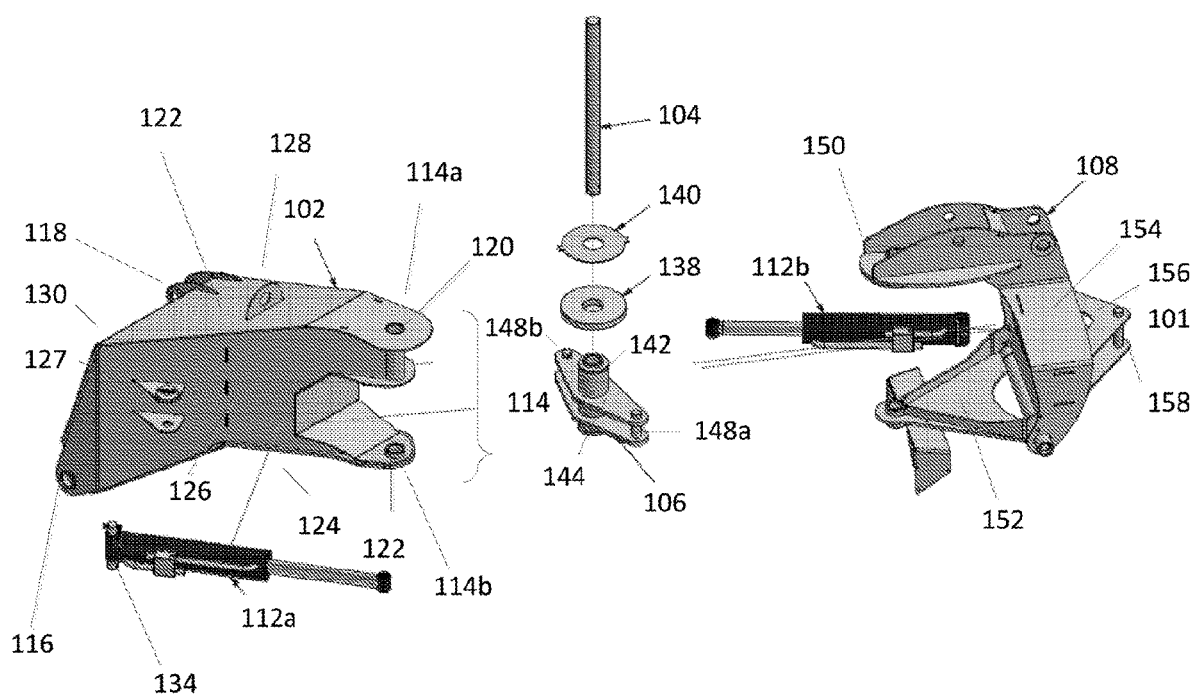
FIG. 4 is an exploded perspective view of the multi-actuator rotator assembly.

FIG. 4 shows the various components of the multi-actuator rotator assembly 100 in an exploded view.

In a typical implementation, the base 102 of the multi-actuator rotator assembly 100 is a weldment, formed by welding together an assembly of pieces. The resulting structure defines the main bracket 114 mentioned above, which again includes an upper bracket portion 114a and a lower bracket portion 114b. The upper bracket portion 114a is contoured to define a first opening 120 that extends vertically through the upper bracket portion 114a from an upper surface thereof to a bottom surface thereof. The lower bracket portion 114b is contoured to define a second opening 122 that extends vertically through the lower bracket portion 114b from an upper surface thereof to a bottom surface thereof. The first opening 120 in the upper bracket portion 114a and the second opening 122 in the lower bracket portion 114b are vertically aligned with one another and sized to allow the pivot shaft 104 to pass through both. The first opening 120 in the upper bracket portion 114a is longer, in a vertical direction, than the second opening 122 in the lower bracket portion 114b.

The main bracket 114 is at the front of the base 102. The base 102 also has a top 122, a bottom 124, sides 126, 128, and a rear 130. The top 122 of the base 102 extends from the forward end of the main bracket 114 rearward, initially in a substantially vertical plane, but bending in a slightly downward direction near the back end of the main bracket 114. A tab 133 with a front-to-back hole in it is connected to and extends in upward direction from the downwardly-angled portion of the top 122 of the base 102. The bottom 124 is at an opposite side of the base 102 from the top 122.

The sides 126, 128 of the base 102 start at the main bracket and extend rearward flaring away from one another. Thus, near the rear 130 of the base 102 the sides 126, 128 are farther apart from one another than they are near the front of the base 102, where the main bracket 114 is located. Since the top 122 and the bottom 124 connect to the sides 126, the top 122 and the bottom 124 have perimeters that are somewhat triangular, becoming narrower toward the front of the base 102 and broader near the rear of the base 102. This somewhat triangular shape helps give the multi-actuator rotator assembly 100 a great deal of strength for supporting heavy loads, such as cantilevered conveyors that may be hung off the front end of the multi-actuator rotator assembly 100.

There is a bracket 127 at a rear part of the right side surface 127 of the base 102 that provides a connection point for the first linear actuator 112a to the base 102. More specifically, the bracket 127 is configured to receive a pin 134 of the first linear actuator 112a that can be held in place in the bracket 127 with a cotter pin, or the like.

The rear 130 of the base 102 is sloped so that the lower part of the rear 130 of the base 102 is farther back from the main bracket 114, for example, the upper part of the rear 130 of the base 102. The lower part of the rear 130 of the base 102 is contoured to define an opening 116 that defines a path that passes laterally through the base 102, from one side (e.g., 126) to the other (e.g., 128) in a substantially horizontal direction. The opening 116 is sized to allow the passage of a support rod (not shown) through the base 102 of the housing, from one side (e.g., 126) to the other side (e.g., 128). In a typical implementation, the multi-actuator rotator assembly 100 can be mounted on this kind of support rod and be able to pivot about an axis (B) defined by the support rod.

There is an additional bracket 118 at the upper part of the rear 130 of the base 102. This additional bracket 118 is on a left side of the base 102. This additional bracket 118 is configured to receive a pin (not shown) to connect to a linear actuator (not shown) that may be coupled, directly or indirectly, to an elevator conveyor or to a temporary storage container, for example. This linear actuator (not shown) may be operable to extend or retract, thereby causing the multi-actuator rotator assembly 100 to pivot about the axis (at 116) relative to the elevator conveyor or the temporary storage container.

Referring again to the main bracket 114 on the base 102, there is a space between the upper bracket portion 114a and the lower bracket portion 114b. When the multi-actuator rotator assembly 100 is assembled, this space accommodates the part of the pivot shaft 104, part of the rotary link 106, an ultra-high-molecular-weight (UHMW) polyethylene pad or washer 138 for the rotary link 106, and a shim 140 for the rotary link 106. More specifically, when assembled, the rotary link 106, the UHMW pad 138, and the shim 140 are stacked—in that order—between the lower bracket portion 114b and the upper bracket portion 114. Moreover, the pivot shaft 104 passes, in a vertical direction, through the first opening 120 in the upper bracket portion 114a, apertures in the shim 140, the UHMW pad 138, and the rotary link 106, and the second opening 122 in the lower bracket portion 114b. In some implementations, the pivot shaft 104 is long enough that it will extend a bit past the top of the upper bracket portion 114a and the bottom of the lower bracket portion 114b and can be held in place—coupled to the main bracket 114—with cotter pins or the like.

The rotary link 106 in the illustrated implementation has a tube portion 142, an upper plate 144, a lower plate 146 and pins 148a, 148b that extend between the plates 144, 148. The tube portion 142 extends vertically between the top of the rotary link 106 and the bottom of the rotary link 106. The tube portion 142 is contoured to define the aperture that receives the pivot shaft 104. The upper plate 144 lies in a horizontal plane, and extends in a largely lateral, outward direction from an outer surface of the tube portion 142. The upper plate 144 has a shape—when viewed from above—that approximates a short, wide triangle with rounded corners. The tube portion 144 passes through the middle of the upper plate 144. The lower plate 142 is below the upper plate 144 and displaced a small distance from the upper plate 142. The lower plate 142 has the same shape and basic configuration relative to the tube portion 142 as the upper plate 142. Pins 148a, 148b extend in a vertical direction between the outer, distal ends of the plates 142 144. When assembled, pin 148a, which is on the right side of the rotary link 106, engages the front end of the first linear actuator 112a, and pin 148b, which is on the left side of the rotary link 106, engages the back end of the second linear actuator 112b. When assembled, the rotary link 106 is able to pivot about the main vertical axis (A) under the influence of the first and second linear actuators 112a, 112b.

The rotating body 108 has an upper plate 150, a lower plate 152, a connecting structure 154 that extends between and connects the upper plate 150 and the lower plate 152, and an actuator connecting structure 156 that provides a pin 158 for connecting the front end of the second linear actuator 114b.

The upper plate 150 of the rotating body 108 lies in a horizontal plane and has an opening that extends vertically through the plate. The lower plate 152 is displaced from the upper plate 150 in a vertical direction and also lies in a horizontal plane. The lower plate 152 has an opening that extends vertically through the plate as well. The openings in the upper and lower plates 150, 152 are aligned with one another. When assembled, the upper plate 150 sits atop the upper bracket portion 114a of the base 102, and the lower plate 152 sits below the lower bracket portion 114b of the base 102, and the openings in the upper and lower plates 150, 152 align with the openings 120, 122 in the upper and lower bracket portions 114a, 114b of the base 102. Moreover, when assembled, the pivot shaft 104 extends through all of those openings.

The connecting structure 154 that extends between and connects the upper plate 150 and the lower plate 152 includes two fins that extend in an upward direction from the upper surface of the upper plate 150. These fins extend forward and then downward, following a downward arc, and flaring outwardly relative to one another, down to the lower plate 152. The fins of the connecting structure 154 connect to opposite outer, forward edges of the lower plate 152 structure.

The fins of the connecting structure 154 support the actuator connecting structure 156 that provides the pin 158 for connecting the front end of the second linear actuator 114b. The actuator connecting structure 156 includes two horizontal plates that parallel to one another and separated from one another by a distance. These plates are connected to, and supported by the fins. The actuator connecting structure 156 projects forward beyond a forward end of the fins. The pin 158 extends, in a vertical direction, between the two plates of the actuator connecting structure. When assembled, the front end of the second linear actuator 112b engages the pin 158.

The rotating body 108 has provisions for mounting external structures (e.g., a cantilevered conveyor) to it. Some of these provisions include sets of mounting holes in the fins of the connecting structure 154. More specifically, the fins in the illustrated implementation have two pairs of mounting holes, with one mounting hole per fin in each pair. The mounting holes in each pair of fins are aligned with one another in a lateral direction so as to be configured to receive a pin or rod that can be part of, or connected to, another structure (e.g., a cantilevered conveyor or the like).

The linear actuators 112a, 112b can be any type of linear actuator—hydraulic, pneumatic, electric, etc. In the illustrated implementation, the linear actuators 112a, 112b are hydraulic actuators. Each linear actuator 112a, 112b includes a hydraulic cylinder with a 4 inch cylindrical bore, a rod or piston that has a 2 inch diameter, a 16 inch stroke, a pin having a 1.5 inch diameter, a dual counterbalance 8 port valve conforming to SAE (Society of Automotive Engineers) valve standards, and operates under a hydraulic pressure of 3000 pounds per square inch (psi).

The multi-actuator rotator assembly 100 can be advantageously utilized in a variety of different applications that require, or that would benefit from, having the kind of motion that the multi-actuator rotator assembly 100 can produce. As an example, the multi-actuator rotator assembly 100 can be used to support the cantilevered loading and/or discharging conveyors in a transloading system, such as the Quickload 300™ transloading system, available from Smart Sand, Inc., which is configured to facilitate the unloading of granular material, such as proppant for hydraulic fracturing, from a bottom dump delivery truck into a silo for storage and eventual use at a worksite, such as a hydraulic fracturing well.

Figure 5:
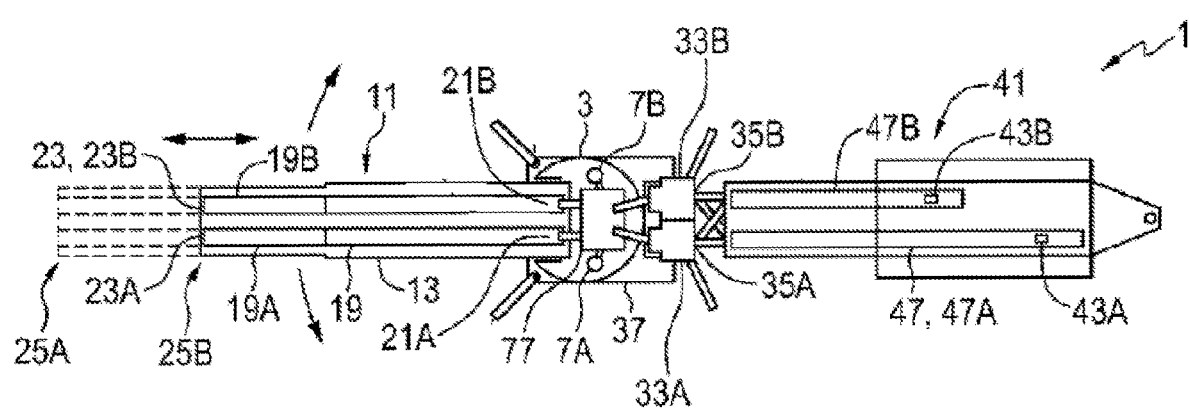
FIG. 5 is a top view of a transloading system that includes a multi-actuator rotator assembly.
Figure 6:
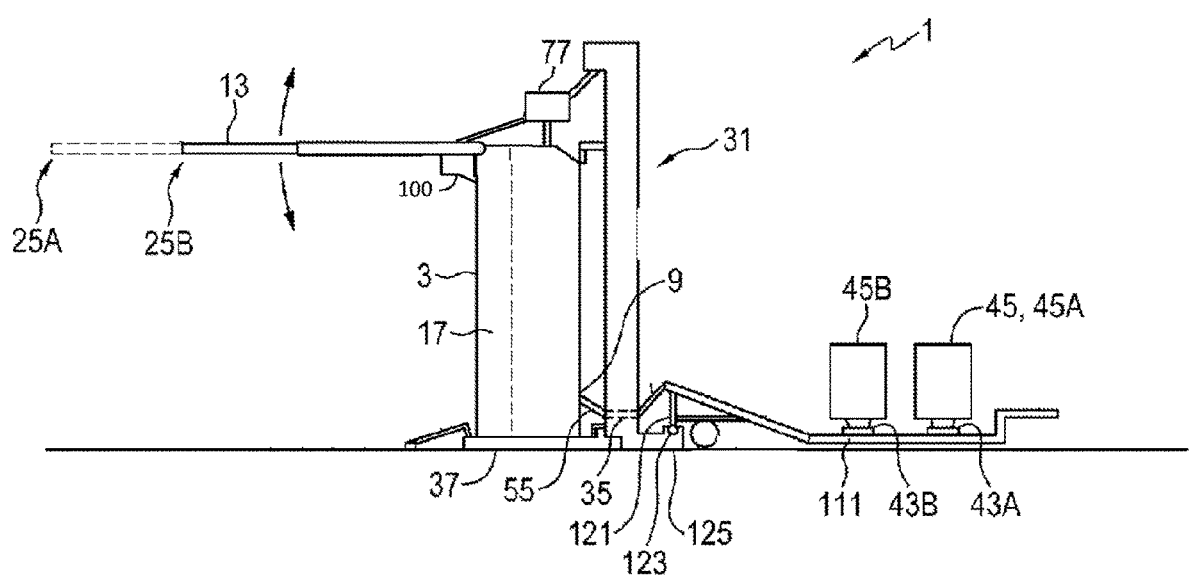
FIG. 6 is a side view of the transloading system of FIG. 5.

FIGS. 5 and 6 are a schematic view showing an implementation of a system 1 for receiving, storing, and distributing granular material. The illustrated system 1 has a receiving conveyor assembly 41 configured to receive granular material from a discharge of one or more transport vehicles, an elevating conveyor assembly 31 configured to receive granular material from the receiving conveyor assembly 41 (via an elevating discharge diverter assembly 77), a distribution conveyor assembly 11 configured to receive granular material from the upper end of the elevating conveyor assembly 31 and deliver the granular material into an opening in a silo (not shown), and a surge bin 3 configured to receive granular material from the upper end of the elevating conveyor assembly 31 if, for example, no silo is available to receive a discharge of the granular material. The elevating conveyor assembly 31 is further configured to move granular material from the bottom of the surge bin 3 back up to the distribution conveyor assembly 11 if necessary when a discharge silo (not shown) subsequently becomes available.

The multi-actuator rotator assembly 100 connects the distribution conveyor assembly 11 to the top of surge bin 3 in a manner that enables the distribution conveyor assembly 11 to move relative to the surge bin 3 in a wide variety of ways. In a typical implementation, this movement enables the distribution conveyor assembly 11 to swing about a vertical axis in an arc that may be at least 200 degrees and typically about 210 degrees, or more. This enables the system 1 to discharge granular material to any one or more of a variety of different silos that may be located within the arc of the swing, without having to relocate the entire system 1. Moreover, in a typical implementation, the distribution conveyor assembly 11 is extendable so that its reach and coverage area is even greater.

In a typical implementation, the movement of the multi-actuator rotator assembly 100 also enables the distribution conveyor assembly 11 to be moved between a stowed position (where the distribution conveyor assembly 11 is close to and substantially parallel to a side surface of the surge bin 3) and an operating position (as shown in FIGS. 5 and 6, where the distribution conveyor assembly 11 is extended in a cantilevered fashion from an upper end of the surge bin 3).

Referring again to FIGS. 5 and 6, the system 1 has an elongate surge bin 3 with a middle wall dividing an interior of the surge bin into first and second storage compartments with corresponding first and second top input openings 7A, 7B and first and second bottom output openings 9. The surge bin 3 is configured to be transported in a horizontal orientation, for example on a trailer, and raised to the vertically oriented operating position shown in FIGS. 5 and 6 at a work site.

The distribution conveyor assembly 11 comprises a distribution frame 13 with an input end and an output end. The distribution frame 13 is pivotally attached at the input end thereof to an upper portion of the surge bin 3 and a multi-actuator rotator assembly 100 is operative to pivot the distribution frame 13 from a transport position extending downward along a wall of the surge bin 3 to an operating position shown in FIGS. 5 and 6 extending laterally from the upper portion of the surge bin 3. In the illustrated system 1 when in the transport position the distribution conveyor assembly 11 is located in a recess 17 in the wall of the surge bin 3.

When the distribution frame 13 is in the operating position, the multi-actuator rotator assembly 100 is operative to pivot the distribution frame about a substantially vertical frame pivot axis and about a substantially horizontal frame pivot axis. First and second distribution conveyors 19A, 19B are mounted on the distribution frame such that corresponding first and second distribution conveyor inputs 21A 21B are adjacent to the input end of the distribution frame 13 and corresponding first and second distribution conveyor outputs 23A, 23B are adjacent to the output end of the distribution frame 13 and adjacent to each other.

In the illustrated system 1 the distribution frame 13 of the distribution conveyor assembly 11 is extendable such that the distribution conveyor outputs 23 are movable from an inner location 25B, closest to the surge bin 3, to an outer location 25A. In a typical installation the system 1 will further comprise first and second storage bins or silos, and the distribution conveyor assembly 11 is movable from a first storage bin loading position, where the distribution conveyor outputs 23 are oriented to discharge granular material into the first storage bin. Once the outputs 23 are in position the distribution frame actuator 15 is activated to pivot the distribution frame 13 about the horizontal frame pivot axis to lower output end 13B of the distribution frame 13 so it rests on the first storage bin. Resting the distribution frame 13 on the first storage bin helps stabilize the entire system 1 to resist wind loads.

The distribution conveyor assembly 11 can also be extended as required and raised or lowered to a second storage bin loading position to orient the distribution conveyor outputs 23 to discharge granular material into the second storage bin, and maneuvered to rest on the second bin. In a typical implementation, the distribution conveyor assembly 11 can be maneuvered laterally and horizontally to transfer granular material into a significant plurality of storage bins.

The elevating conveyor assembly 31 comprises a first elevating conveyor 33A operative to receive granular material at a first elevating input 35A and discharge the received granular material selectively into any one of the first top input opening 7A, the second top input opening 7B, the first distribution conveyor input 21A, and the second distribution conveyor input 21B. A second elevating conveyor 33B is operative to receive granular material at a second elevating input 35B and is also operative to discharge the received granular material selectively into any one of the first top input opening 7A, the second top input opening 7B, the first distribution conveyor input 21A, and the second distribution conveyor input 21B.

The elevating conveyor assembly 31 is configured to be transported in a horizontal orientation, for example on a trailer, and raised to an operating position, as shown in FIGS. 5 and 6, attached to a side of the surge bin 3 opposite the distribution conveyor assembly 11 and supported on a base 37 of the surge bin 3.

The elevating conveyor assembly 31 is fed by the receiving conveyor assembly 41 comprising a first receiving station 43A configured to receive granular material from a discharge of a first transport vehicle 45A and a second receiving station 43B configured to receive granular material from a discharge of a second transport vehicle 45B at the same time the first receiving station 43A is receiving granular material from the discharge of the first transport vehicle 45A. As seen in FIG. 6, the transport vehicles 45 can be positioned side by side and discharge at the same time.

A first receiving conveyor 47A is operative to transfer granular material from the first receiving station 43A selectively into either one of the first and second elevating inputs 35A, 35B. A second receiving conveyor 47B is operative to transfer granular material from the second receiving station 43A selectively into either one of the first and second elevating inputs 35A, 35B.

A system like the one shown in FIGS. 5 and 6, but not including the multi-actuator rotator assembly 100 mentioned herein, is described in U.S. Pat. No. 10,065,814, entitled Transportable Receiving and Storage System with Redundancy. The disclosure of that patent is hereby incorporated herein in its entirety.

The system 1 in FIGS. 5 and 6 includes multi-actuator rotator assembly 100 that connects the distribution conveyor assembly 11 to the top of surge bin 3. Of course, in other implementations, the system 1 may additionally or alternatively include a multi-actuator rotator assembly 100 that connects the receiving conveyor assembly 41 to the elevating conveyor assembly 31.

A number of embodiments of the invention have been described. Nevertheless, it will be understood that various modifications may be made without departing from the spirit and scope of the invention.

For example, the absolute and relative size, and specific shape of each component of the multi-actuator rotator assembly can vary. For example, the base 102 can have a different size and can be any one of a variety of different shapes. Likewise, the rotating body 108 can have a different size and can be any one of a variety of different shapes. The options for size and shape of the rotary link 106 are also varied. Moreover, the way in which the various components are coupled to one another can vary as well. The linear actuators can be virtually any kind of linear actuators—electric, pneumatic, hydraulic, etc. A system would generally include a controllable source of electricity, pneumatics, hydraulics, etc., as required to cause the linear actuator to operate.

In a typical implementation, the multi-actuator rotator assembly has a single pivot shaft and both the rotary link and the rotating body pivot about a main axis that is defined by the pivot shaft. It is possible, however, that a multi-actuator rotator assembly could have more than one pivot shaft and that the rotary link and rotating body might pivot about a different axis defined by the different pivot shafts. Moreover, in some implementations, the rotary link and the rotating body may be coupled to the base in a manner that allows each element to pivot relative to the base, even without being coupled to a shaft of any kind.

The multi-actuator rotator assembly and its various components can be made from any number of possible materials—typically rigid, sturdy materials, such as metal or the like.

The multi-actuator rotator assembly can be utilized in a wide variety of potential applications.

Relative terminology, such as above, below, front, rear, forward, rearward, horizontal, vertical, etc., may have been used herein. Unless otherwise indicated, any relative terminology is used solely for the purposes of clarity and is not intended to limit the scope of what is described here to require particular positions and/or orientations. Accordingly, such relative terminology should not be construed to limit the scope of the present application.

Moreover, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of subcombinations.

Similarly, while operations are described herein as occurring in a particular order, this should not be understood as requiring that such operations be performed in the particular order disclosed or in sequential order, or that all such operations be performed, to achieve desirable results.

Other implementations are within the scope of the claims.

What is claimed is:

1. A multi-actuator rotator assembly comprising:
a base;
a rotary link coupled to the base and able to pivot relative to the base;
a rotating body coupled to the base and able to pivot relative to the base;
a first linear actuator connected to the base and to a first side of the rotary link; and
a second linear actuator connected to a second side of the rotary link and to the rotating body;
a pivot shaft coupled to the base,
wherein the rotary link is coupled to the base via the pivot shaft and is able to pivot relative to the base about a main shaft defined by the pivot shaft, and
wherein the rotating body is coupled to the base via the pivot shaft and is able to pivot relative to the base about a main shaft defined by the pivot shaft.

2. The multi-actuator rotator assembly of claim 1, wherein each of the first and second linear actuators has an inner piston and an outer cylinder that move relative to each other in a linear fashion between a fully retracted position and a fully extended position.

3. The multi-actuator rotator assembly of claim 1, wherein the first and second linear actuators extend and retract opposite one other, such that:

while the first linear actuator is extending, the second linear actuator is retracting, and while the second linear actuator is extending, the first linear actuator is retracting.

4. The multi-actuator rotator assembly of claim 3 configured such that when the first linear actuator is in a fully retracted position and the second linear actuator is in a fully extended position, the rotating body of the multi-actuator rotator assembly is in an extreme right position, and when the first linear actuator is in a fully extended position and the second linear actuator is in a fully retracted position, the rotating body of the multi-actuator rotator assembly is in an extreme left position.

5. The multi-actuator rotator assembly of claim 4, wherein an angular distance between the extreme right and extreme left positions is at least 200 degrees.

6. The multi-actuator rotator assembly of claim 4, configured such that:

when the first and second linear actuators are midway between fully extended and fully retracted positions, the rotating body of the multi-actuator rotator assembly is 100 degrees from the extreme right position and 110 degrees from the extreme left position.

7. The multi-actuator rotator assembly of claim 6, wherein the first linear actuator is on a right side of the multi-actuator rotator.

8. The multi-actuator rotator assembly of claim 1, wherein the base is contoured to define an opening that defines a path that passes laterally through the base from one side to an opposite side in a horizontal direction, wherein the opening is sized to allow the passage of a support rod through the base, upon which the multi-actuator rotator assembly can be mounted and able to pivot about an axis defined by the support rod.

9. The multi-actuator rotator assembly of claim 8, further comprising:

a bracket at a rear of the base, wherein the bracket is configured to be coupled to a mounting surface for the multi-actuator rotator assembly by a linear actuator that is operable to extend or retract, thereby causing the multi-actuator rotator assembly to pivot about the axis defined by the support rod.

10. A system comprising:
a support structure;
a multi-actuator rotator assembly coupled to the support structure; and
a supported assembly coupled to the multi-actuator rotator assembly,
wherein the multi-actuator rotator assembly comprises:
a base;
a rotary link coupled to the base and able to pivot relative to the base about a main axis;
a rotating body coupled to the base and able to pivot relative to a pivot shaft about the main axis;
a first linear actuator connected to the base and to a first side of the rotary link; and
a second linear actuator connected to a second side of the rotary link and to the rotating body.

11. The system of claim 10, wherein the base of the multi-actuator rotator assembly is coupled to the support structure, wherein the supported assembly is coupled to the rotating body of the multi-actuator rotator assembly.

12. The system of claim 10, wherein the multi-actuator rotator assembly further comprises:
a pivot shaft coupled to the base, wherein the rotary link is coupled to the base via the pivot shaft and is able to pivot relative to the base about a main shaft defined by the pivot shaft, and wherein the rotating body is coupled to the base via the pivot shaft and is able to pivot relative to the base about a main shaft defined by the pivot shaft.

13. The system of claim 10, wherein each of the first and second linear actuators has an inner piston and an outer cylinder that move relative to each other in a linear fashion between a fully retracted position and a fully extended position, wherein when the first linear actuator is in a fully retracted position and the second linear actuator is in a fully extended position, the rotating body of the multi-actuator rotator assembly is in an extreme right position, and when the first linear actuator is in a fully extended position and the second linear actuator is in a fully retracted position, the rotating body of the multi-actuator rotator assembly is in an extreme left position, and wherein an angular distance between the extreme right and extreme left positions is at least 200 degrees.

14. The system of claim 10, wherein the supported assembly is a conveyor assembly.

15. The system of claim 10, wherein the system is for receiving, storing, and distributing granular material and wherein:

the supported assembly is a distribution conveyor assembly that comprises:
a distribution frame with an input end and an output end; and
a distribution conveyor mounted on the distribution frame with a distribution conveyor input adjacent to the input end of the distribution frame and a distribution conveyor output adjacent to the output end of the distribution frame;

the system comprising an elevating conveyor assembly with an elevating conveyor configured to discharge granular material selectively to a top input opening of a surge bin or to the distribution conveyor input; and wherein the support structure is part of the surge bin or part of the elevating conveyor assembly.

16. A method comprising:
providing, at a worksite, a system that comprises:
a support structure;
a multi-actuator rotator assembly coupled to the support structure; and
a supported assembly coupled to the multi-actuator rotator assembly,
wherein the multi-actuator rotator assembly comprises:
a base;
a rotary link coupled to the base and able to pivot relative to the base about a main axis;
a rotating body coupled to the base and able to pivot relative to a pivot shaft about the main axis;
a first linear actuator connected to the base and to a first side of the rotary link; and
a second linear actuator connected to a second side of the rotary link and to the rotating body,
wherein the base of the multi-actuator rotator assembly is coupled to the support structure, and wherein the supported assembly is coupled to the rotating body of the multi-actuator rotator assembly; and pivoting the supported structure relative to support structure from a first position to a second position, at the worksite, with the multi-actuator rotator assembly.

17. The method of claim 16, wherein the supported structure is pivoted between the first position and the second position by an angular distance of at least 200 degrees.

18. A multi-actuator rotator assembly comprising:
a base;
a rotary link coupled to the base and able to pivot relative to the base;
a rotating body coupled to the base and able to pivot relative to the base;
a first linear actuator connected to the base and to a first side of the rotary link; and
a second linear actuator connected to a second side of the rotary link and to the rotating body,
wherein each of the first and second linear actuators has an inner piston and an outer cylinder that move relative to each other in a linear fashion between a fully retracted position and a fully extended position.

19. A multi-actuator rotator assembly comprising:
a base;
a rotary link coupled to the base and able to pivot relative to the base;
a rotating body coupled to the base and able to pivot relative to the base;
a first linear actuator connected to the base and to a first side of the rotary link; and
a second linear actuator connected to a second side of the rotary link and to the rotating body,
wherein the first and second linear actuators extend and retract opposite one other, such that:
    while the first linear actuator is extending, the second linear actuator is retracting, and
    while the second linear actuator is extending, the first linear actuator is retracting.

20. The multi-actuator rotator assembly of claim 19 configured such that when the first linear actuator is in a fully retracted position and the second linear actuator is in a fully extended position, the rotating body of the multi-actuator rotator assembly is in an extreme right position, and
    when the first linear actuator is in a fully extended position and the second linear actuator is in a fully retracted position, the rotating body of the multi-actuator rotator assembly is in an extreme left position.

21. The multi-actuator rotator assembly of claim 20, wherein an angular distance between the extreme right and extreme left positions is at least 200 degrees.

22. The multi-actuator rotator assembly of claim 20, configured such that:
    when the first and second linear actuators are midway between fully extended and fully retracted positions, the rotating body of the multi-actuator rotator assembly is 100 degrees from the extreme right position and 110 degrees from the extreme left position.

23. The multi-actuator rotator assembly of claim 22, wherein the first linear actuator is on a right side of the multi-actuator rotator.

24. A multi-actuator rotator assembly comprising:
a base;
a rotary link coupled to the base and able to pivot relative to the base;
a rotating body coupled to the base and able to pivot relative to the base;
a first linear actuator connected to the base and to a first side of the rotary link; and
a second linear actuator connected to a second side of the rotary link and to the rotating body,
wherein the base is contoured to define an opening that defines a path that passes laterally through the base from one side to an opposite side in a horizontal direction, and
wherein the opening is sized to allow the passage of a support rod through the base, upon which the multi-actuator rotator assembly can be mounted and able to pivot about an axis defined by the support rod.

25. The multi-actuator rotator assembly of claim 24, further comprising:
a bracket at a rear of the base, wherein the bracket is configured to be coupled to a mounting surface for the multi-actuator rotator assembly by a linear actuator that is operable to extend or retract, thereby causing the multi-actuator rotator assembly to pivot about the axis defined by the support rod.

* * * * *